No. 776,773. PATENTED DEC. 6, 1904.
T. A. BLAKELY.
ROLLER BEARING.
APPLICATION FILED JUNE 25, 1904.
NO MODEL.
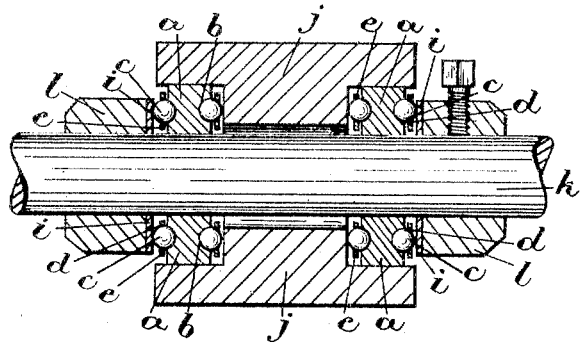
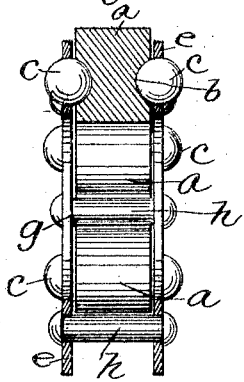
Fig.4.
Fig.1.
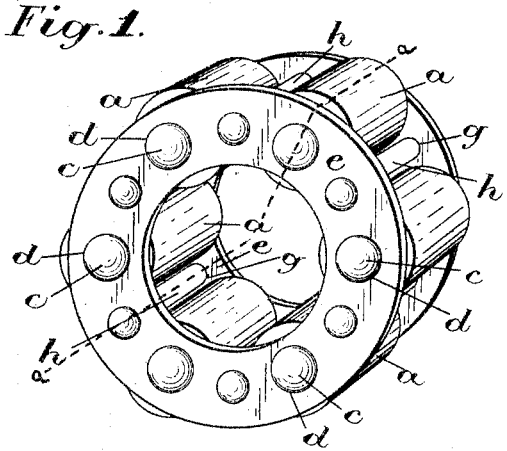
Fig.2.
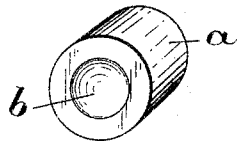
Fig.3.
Witnesses.
H. L. Trimble
L. F. Brock
Inventor.
Thos. A Blakely
by C. H. Riches
his attorney No. 776,773.

Patented December 6, 1904.

UNITED STATES PATENT OFFICE.

THOMAS A. BLAKELY, OF FLESHERTON, CANADA, ASSIGNOR OF ONE-HALF TO FREDERICK W. HARRISON, OF OWEN SOUND, ONTARIO, CANADA.

ROLLER-BEARING.

SPECIFICATION forming part of Letters Patent No. 776,773, dated December 6, 1904.

Application filed June 25, 1904. Serial No. 214,119. (No model.)

*To all whom it may concern:*

Be it known that I, THOMAS ALBERT BLAKELY, of Flesherton, in the county of Grey and Province of Ontario, Canada, have invented certain new and useful Improvements in Roller-Bearings; and I hereby declare that the following is a full, clear, and exact description of the same.

This invention relates to certain new and useful improvements in that class of roller-bearings in which the bearing-rollers are journaled in annular bearing-rings tied together and revoluble around the shaft, and it relates more particularly to the peculiar construction of the bearing-rollers and annular retaining-rings and the means whereby the bearing-rollers are journaled therein, the object of the invention being not only to reduce the frictional contact between the journals of the bearing-rollers and their bearings in the annular retaining-rings, but also to absorb the end thrust of the rollers.

In carrying out these objects the annular retaining-rings are provided with a series of equispaced ball-apertures so arranged that the ball-apertures of one ring aline with those of the other, and these rings are rigidly fastened together by bolts or rivets having abutting shoulders to engage the inner surfaces of the rings and hold them evenly spaced. Contained between the annular retaining-rings are antifriction bearing-rollers and formed in the ends of the antifriction bearing-rollers are concaved recesses to receive the antifriction-balls which enter the apertures in the retaining-rings and constitute the means whereby the bearing-rollers are journaled therein.

For a full understanding of the invention reference is to be had to the following description and to the accompanying drawings, in which—

Figure 1 is a sectional view of a shaft and hub, showing the roller-bearings therefor. Fig. 2 is a perspective view of the bearing-rollers and retaining-cage. Fig. 3 is a perspective view of one of the bearing-rollers looking at it from the end. Fig. 4 is a sectional view on the lines *a a*, Fig. 2.

Like letters of reference refer to like parts throughout the specification and drawings.

In the center of the ends of the antifriction bearing-rollers *a* are concaved recesses *b*, and contained in these recesses are antifriction-balls *c*, journaled in and protruding through corresponding ball-apertures *d* in the annular retaining-rings *e*. The annular retaining-rings *e* are separated laterally by the abutting shoulders *g* of the tie-pins *h*, which engage their inner faces and the reduced ends of which project through corresponding apertures in the annular retaining-rings and are riveted against the outer faces of the same to hold the retaining-rings in position, so that the ball-apertures *d* in the retaining-rings will aline and form the bearings for the antifriction-balls *c*, which constitute the journals of the bearing-rollers. Loosely mounted on the axle *k* on the outer faces of the retaining-rings *e* are antifriction-washers *i* to contact the protruding parts of the antifriction-balls.

The bearing-rollers fit loosely between the inner faces of the retaining-rings and project slightly beyond the inner and outer edges thereof, so as to engage the bore of the hub *j*, which is loosely mounted upon the axle *k* and held from contact therewith by the bearing-rollers *a*. Mounted upon the axle on the outer sides of the hub *j* are adjustable collars *l*, which engage the outer surfaces of the antifriction-washers *i* and lock them in position against the ends of the antifriction-balls, so as to maintain the antifriction-balls in position while forming a rolling contact therewith.

In the operation of the apparatus the hub and the axle engage the antifriction bearing-rollers during the independent revolution of the hub upon the bearing-rollers and the combined revolution of the bearing-rollers and retaining-rings around the shaft, the ends of the bearing-rollers revolving against the antifriction-balls as they revolve in their bearings in the retaining-rings, the friction of the revolution of the bearing-rollers being minimized by their rolling contact with the balls and the rolling contact of the balls in the ball-apertures of the retaining-rings. The end-thrust motion of the bearing-rollers is absorbed by the antifriction-balls and the antifriction-washers and is resisted by the adjusting-collars mounted upon the shaft.

It is not desired to confine the use of the invention exclusively to one particular bearing, as I may employ it for any revoluble device which is loosely mounted on a shaft, or I may use it in conjunction with a shaft revoluble in a stationary bearing in which it is necessary to provide for end-thrust motion as well as for its comparatively frictionless revolution.

Having thus fully described my invention, what I claim as new, and desire to secure by Letters Patent, is—

In a roller-bearing the combination of a stationary shaft, annular retaining-rings loosely mounted thereon, bearing-rollers contained between the retaining-rings and having centrally-concaved ends with which aline corresponding ball-apertures in the retaining-rings, antifriction-balls contained within the concaved ends and protruding beyond the side face of the retaining-rings, antifriction-washers to engage the protruding parts of the antifriction-balls and adjustable locking means to position the antifriction-washers against the ends of the antifriction-balls.

Flesherton, June 15, A. D. 1904.

THOMAS A. BLAKELY.

In presence of—
J. S. HORNING,
A. D. GREASOR.